(12) United States Patent
Ogura et al.

(10) Patent No.: US 11,886,217 B2
(45) Date of Patent: Jan. 30, 2024

(54) CONTROL DEVICE AND SOLAR POWER GENERATION SYSTEM

(71) Applicant: OMRON Corporation, Kyoto (JP)

(72) Inventors: Ryo Ogura, Osaka (JP); Tomoko Endo, Arlington Heights, IL (US); Erica Martin, Village of Lakewood, IL (US); Tsuyoshi Uchida, Bartlett, IL (US)

(73) Assignee: OMRON CORPORATION, Kyoto (JP)

( * ) Notice: Subject to any disclaimer, the term of this patent is extended or adjusted under 35 U.S.C. 154(b) by 117 days.

(21) Appl. No.: 17/435,038

(22) PCT Filed: Mar. 14, 2019

(86) PCT No.: PCT/JP2019/010540
§ 371 (c)(1),
(2) Date: Aug. 31, 2021

(87) PCT Pub. No.: WO2020/183700
PCT Pub. Date: Sep. 17, 2020

(65) Prior Publication Data
US 2022/0137657 A1 May 5, 2022

(51) Int. Cl.
*G05F 1/06* (2006.01)
*H02J 3/00* (2006.01)
(Continued)

(52) U.S. Cl.
CPC .............. *G05F 1/67* (2013.01); *H02J 3/007* (2020.01); *H02J 3/381* (2013.01); *H02J 2300/26* (2020.01)

(58) Field of Classification Search
CPC ... G05F 1/67; H02J 3/007; H02J 3/381; H02J 2300/26; Y02E 10/56
See application file for complete search history.

(56) References Cited

U.S. PATENT DOCUMENTS

2013/0241298 A1 9/2013 Ishii et al.
2014/0161201 A1 6/2014 Yukizane et al.
(Continued)

FOREIGN PATENT DOCUMENTS

JP 1-313817 A 12/1989
JP 8-46231 A 2/1996
(Continued)

OTHER PUBLICATIONS

The International Search Report of International Application No. PCT/JP2019/010540 dated Jun. 18, 2019.
(Continued)

*Primary Examiner* — Elim Ortiz
(74) *Attorney, Agent, or Firm* — SHINJYU GLOBAL IP (57) ABSTRACT

A control device is connected to at least one solar cell module and an inverter, and controls the at least one solar cell module by MPPT control. The control device includes an opening/closing unit and a control unit. The opening/closing unit includes a semiconductor relay and a mechanical relay connected in parallel with the semiconductor relay. The control unit controls opening and closing of the opening/closing unit in response to a control signal from the inverter. In a case of connecting the at least one solar cell module and the inverter, the control unit turns ON the semiconductor relay to turn ON the mechanical relay, and then disconnects the semiconductor relay. In a case of cutting off the connection between the at least one solar cell module and the inverter, the control unit connects the semiconductor relay to disconnect the mechanical relay, and then disconnects the semiconductor relay.

4 Claims, 6 Drawing Sheets

(51) Int. Cl.
    *H02J 3/38*        (2006.01)
    *G05F 1/67*        (2006.01)

(56)            References Cited

U.S. PATENT DOCUMENTS

2017/0346295 A1*  11/2017  Yoscovich ................ H02J 1/12
2018/0219394 A1*   8/2018  Tomita ................... G01R 31/40
2018/0351401 A1   12/2018  Binder et al.
2019/0363200 A1*  11/2019  Höft ....................... H02S 40/36
2020/0402738 A1   12/2020  Tsukamoto et al.

FOREIGN PATENT DOCUMENTS

| JP | 2002-91586   | A  |   | 3/2002  |
| JP | 2005-175370  | A  |   | 6/2005  |
| JP | 2010-521720  | A  |   | 6/2010  |
| JP | 2011-238087  | A  |   | 11/2011 |
| JP | 2011-238088  | A  |   | 11/2011 |
| JP | 2014-79076   | A  |   | 5/2014  |
| JP | 2015-115173  | A  |   | 6/2015  |
| JP | 2015115173   |    | * | 6/2015  |
| JP | 2018-124166  | A  |   | 8/2018  |
| WO | 2008/132553  | A2 |   | 11/2008 |
| WO | 2013014879   | A1 |   | 1/2013  |
| WO | 2017204038   | A1 |   | 11/2017 |

OTHER PUBLICATIONS

The Written Opinion of the International Searching Authority of International Application No. PCT/JP2019/010540 dated Jun. 18, 2019.
The Office Action of the corresponding Japanese application No. 2021-505451 dated Oct. 11, 2022.
The Office Action of the corresponding Japanese application No. 2021-505451 dated Apr. 11, 2023.

* cited by examiner

CONTROL DEVICE AND SOLAR POWER GENERATION SYSTEM

This application is the U.S. National Phase of International Application No. PCT/JP2019/010540, filed on Mar. 14, 2019.

FIELD

The present invention relates to a control device and a solar power generation system.

BACKGROUND

In recent years, solar power generation systems perform so-called MPPT (Maximum Power Point Tracking) control that tracks the optimum operating point of each solar cell module therein to improve the efficiency of power generation. For example, United States Patent Application Publication No. 2018/0351401 discloses a configuration in which MPPT control is performed for each solar cell module. In the configuration, a control device for MPPT control is installed for each solar cell module. Such a control device includes an opening/closing unit that cuts off the connection between the solar cell modules and an inverter at the time of decrease in the output of the solar cell modules or in an emergency such as a fire, and the opening/closing unit uses a semiconductor relay.

SUMMARY

A semiconductor relay has an on-resistance higher than that of a mechanical relay, and thereby the efficiency of a solar power generation system in power generation is lowered when the solar cell modules and the inverter therein are in an energized state via a semiconductor relay. In particular, in United States Patent Application Publication No. 2018/0351401, since the control device is installed for each of the solar cell modules, the power generation loss of the solar power generation system increases in proportion to the number of the control devices installed.

An object of the present invention is to provide a control device capable of reducing the loss of power generation efficiency of a solar cell module. Another object of the present invention is to provide a solar power generation system capable of reducing the loss of power generation efficiency while decreasing the installation cost of control devices in the solar power generation system.

A control device according to one aspect of the present invention is a control device in a solar power generation system. The control device is connected to at least one solar cell module and an inverter and controls the at least one solar cell module by MPPT control. The control device includes an opening/closing unit and a control unit. The opening/closing unit includes a semiconductor relay and a mechanical relay connected in parallel with the semiconductor relay, and opens and closes a connection between the at least one solar cell module and the inverter. The control unit controls the opening and closing of the opening/closing unit in response to a control signal from the inverter. In a case of connecting the at least one solar cell module and the inverter, the control unit turns ON the semiconductor relay to turn ON the mechanical relay, and then turns OFF the semiconductor relay while the mechanical relay is in an ON state, and in a case of cutting off the connection between the at least one solar cell module and the inverter, the control unit turns ON the semiconductor relay to turn OFF the mechanical relay, and then turns OFF the semiconductor relay while the mechanical relay is in an OFF state.

In this control device, when the at least one solar cell module and the inverter are connected, that is, during power generation, the at least one solar cell module and the inverter are connected via the mechanical relay. In other words, since the mechanical relay is used for the connection at the time of energization, it is possible to reduce the loss of power generation efficiency due to the influences of the on-resistance of the semiconductor relay during power generation. Further, since the semiconductor relay is not used for continuous energization, the control device can be downsized by eliminating heat dissipation parts such as a heat sink. Furthermore, using the mechanical relay and the semiconductor relay in combination allows the opening/closing unit to be controlled for opening and closing more frequently by the control unit as compared with the case where only a mechanical relay is used.

Preferably, the control device controls, by MPPT control, a plurality of solar cell modules connected in series. In this case, it is possible to reduce the loss of power generation efficiency due to the influences of the on-resistance of the semiconductor relay, while reducing the installation cost of the control devices.

Preferably, the control device is driven by power supplied from the at least one solar cell module. In this case, for example, when installing the control device in an existing solar power generation system, it is not necessary to connect the inverter and the control device to secure the power supply for the control device. As a result, no additional wiring for connecting the inverter and the control device is required, reducing the installation cost of the control device.

Preferably, the control device receives a control signal from the inverter via power line communication. In this case, for example, when installing the control device in an existing solar power generation system, no additional wiring for ensuring the communication between the inverter and the control device is required, reducing the installation cost of the control device.

A solar power generation system according to one aspect of the present invention includes a plurality of solar cell module groups, an inverter, and control devices. The plurality of solar cell module groups include, respectively, a plurality of solar cell modules and are connected in series with each other. The inverter is connected to the plurality of solar cell module groups and converts DC power generated by the plurality of solar cell modules into AC power. The control devices are installed, respectively, in the solar cell module groups and control the solar cell modules in the unit of the plurality of solar cell module groups by MPPT control. The control devices each include an opening/closing unit and a control unit. The opening/closing unit includes a semiconductor relay and a mechanical relay connected in parallel with the semiconductor relay, and opens and closes a connection between the plurality of solar cell module groups and the inverter. The control unit controls an opening and closing of the opening/closing unit in response to a control signal from the inverter. In a case of connecting the plurality of solar cell module groups and the inverter, the control unit turns ON the semiconductor relay to turn ON the mechanical relay, and then turns OFF the semiconductor relay while the mechanical relay is in an ON state, and in a case of cutting off the connection between the plurality of solar cell module groups and the inverter, the control unit turns ON the semiconductor relay to turn OFF the mechanical relay, and then turns OFF the semiconductor relay while the mechanical relay is in an OFF state.

In the solar power generation system, when the plurality of solar cell module groups and the inverter are connected, that is, during power generation, the plurality of solar cell module groups and the inverter are connected via a mechanical relay. In other words, since a mechanical relay is used for the connection at the time of energization, it is possible to reduce the loss of power generation efficiency due to the influences of the on-resistance of the semiconductor relay during power generation. Further, since the semiconductor relay is not used for continuous energization, the control device can be downsized by eliminating heat dissipation parts such as a heat sink. Furthermore, since the control device is installed in the unit of solar cell module groups, reduction in the loss of power generation efficiency due to the influences of the on-resistance of the semiconductor relay is achievable while reducing the installation cost of the control device.

DETAILED DESCRIPTION

Figure 1:
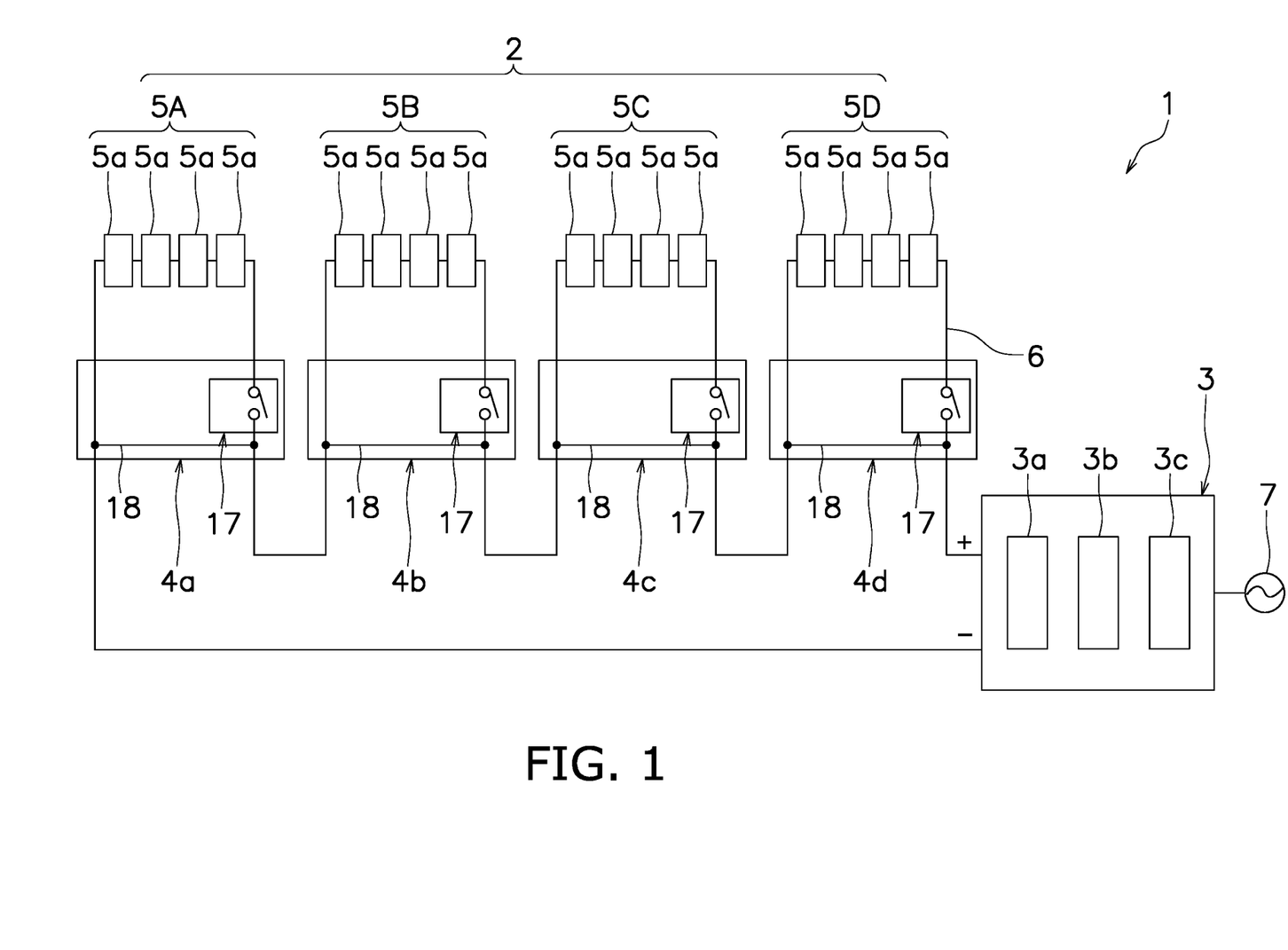
FIG. 1 is a block diagram schematically illustrating a configuration of a solar power generation system according to one aspect of the present invention.

FIG. 1 is a block diagram schematically illustrating a configuration of a solar power generation system 1 according to one aspect of the present invention. The solar power generation system 1 includes a string 2, an inverter 3, and a plurality of control devices 4a to 4d.

The string 2 includes a plurality of solar cell module groups 5A to 5D connected to each other in series. Each of the solar cell module groups 5A to 5D includes a plurality of solar cell modules 5a. Each of the solar cell module groups 5A to 5D in the present embodiment includes four solar cell modules 5a connected in series. That is, the string 2 includes 16 solar cell modules 5a connected in series. The solar power generation system 1 may include a solar cell array in which a plurality of the strings 2 are connected in parallel.

The solar cell modules 5a each receive sunlight to generate electrical power, and output the generated electrical power to the inverter 3. The open circuit voltage of the solar cell modules 5a is, for example, 50 V.

The inverter 3 is connected to the string 2 via a power line 6. The inverter 3 converts the DC power output from the solar cell modules 5a into AC power. The inverter 3 is connected to a power system 7 and thereby supplies AC power to a commercial power system or a load device.

Specifically, the inverter 3 includes a DC/DC converter 3a, a DC/AC inverter 3b, and a control unit 3c. The DC/DC converter 3a converts the voltage of the electrical power output from the solar cell modules 5a into a predetermined voltage, which is input to the DC/AC inverter 3b. The DC/AC inverter 3b converts the DC power output from the solar cell modules 5a into AC power via the DC/DC converter 3a. The control unit 3c includes a CPU, a memory, and the like, and controls the DC/DC converter 3a and the DC/AC inverter 3b. The control unit 3c also controls the control devices 4a to 4d individually by power line communication.

The control devices 4a to 4d control the solar cell modules 5a by MPPT (Maximum Power Point Tracking) control. In the present embodiment, the control devices 4a to 4d are installed in each of the solar cell module groups 5A to 5D, and the MPPT control on the solar cell modules 5a is performed in the unit of the solar cell module groups 5A to 5D. Specifically, the control device 4a controls the solar cell module group 5A by MPPT control. The control device 4b controls the solar cell module group 5B by MPPT control. The control device 4c controls the solar cell module group 5C by MPPT control. The control device 4d controls the solar cell module group 5D by MPPT control. The control devices 4a to 4d are externally attached to the solar cell modules 5a of the solar cell module groups 5A to 5D.

Figure 2:
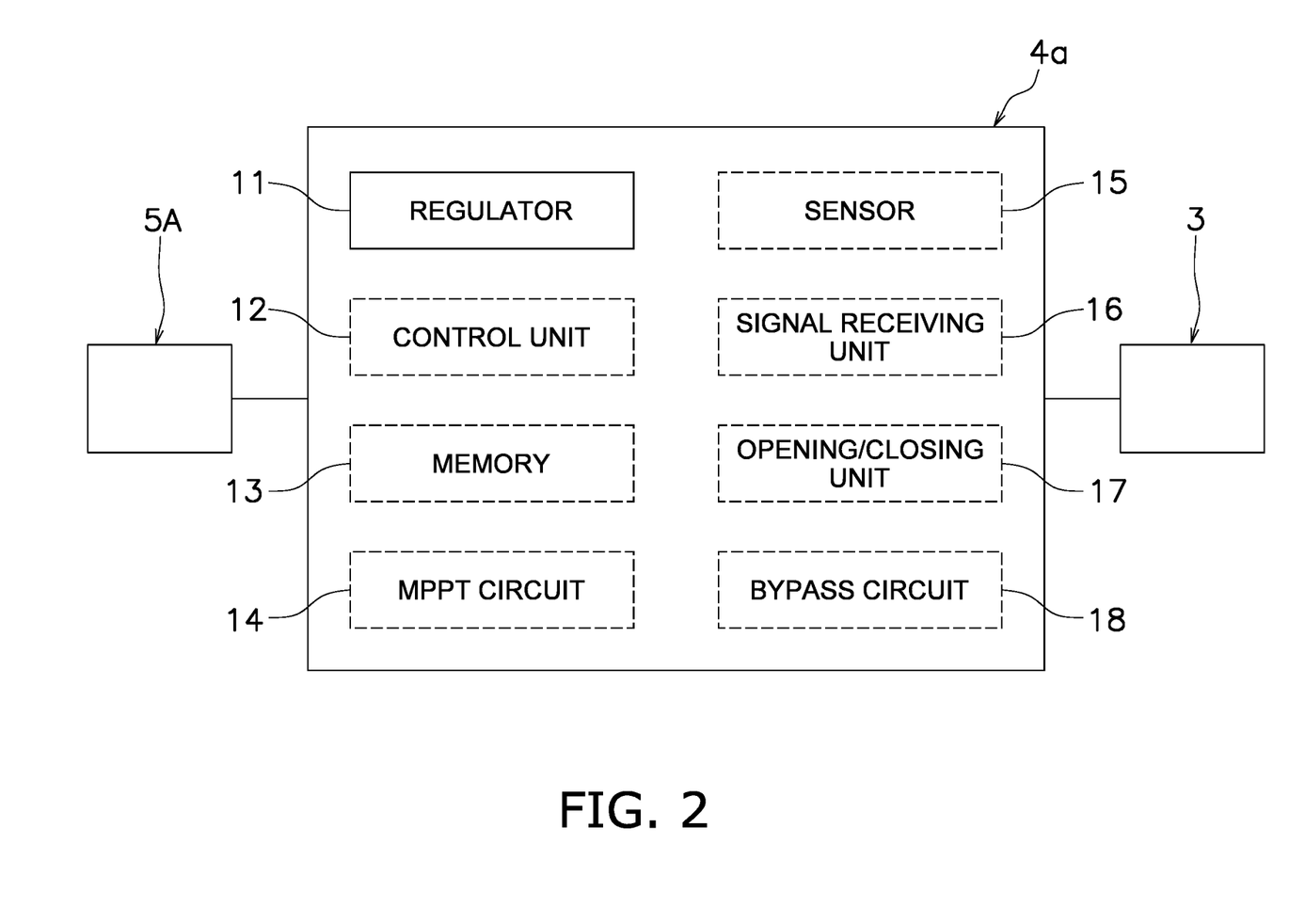
FIG. 2 is a block diagram schematically illustrating a configuration of a control device.

FIG. 2 is a block diagram schematically illustrating a configuration of the control device 4a. The control device 4a includes a regulator 11, a control unit 12, a memory 13, an MPPT circuit 14, a sensor 15, a signal receiving unit 16, an opening/closing unit 17, and a bypass circuit 18.

The control unit 12 is, for example, a processor, and executes various programs stored in the memory 13 in response to a control signal output from the control unit 3c of the inverter 3 and received at the signal reception unit 16, an output signal from the sensor 15, or the like. The memory 13 is composed of a storage medium such as a flash memory or a hard disk drive, for example.

The control unit 12 controls the opening and closing of the opening/closing unit 17 in response to a control signal from the inverter 3 or an output signal from the sensor 15. The control unit 12 also controls the solar cell modules 5a by MPPT control. In the present embodiment, the control unit 12 collectively controls the solar cell modules 5a of the solar cell module group 5A by MPPT control. Specifically, the control unit 12 follows the optimum operating point of the solar cell module group 5A based on an output signal from the sensor 15, and controls, using the MPPT circuit 14, the voltage and current of the solar cell module group 5A, so that the solar cell module group 5A operates constantly at the maximum power point. The MPPT circuit 14 includes, for example, a booster circuit, a buck circuit, or a buck-boost circuit.

The sensor 15 measures a voltage value and a current value output from the solar cell module group 5A and outputs them to the control unit 12.

The signal receiving unit 16 receives a control signal from the control unit 3c of the inverter 3 and outputs the received control signal to the control unit 12. The signal receiving unit 16 may output a signal received from an external device by wireless communication to the control unit 12.

Figure 3:
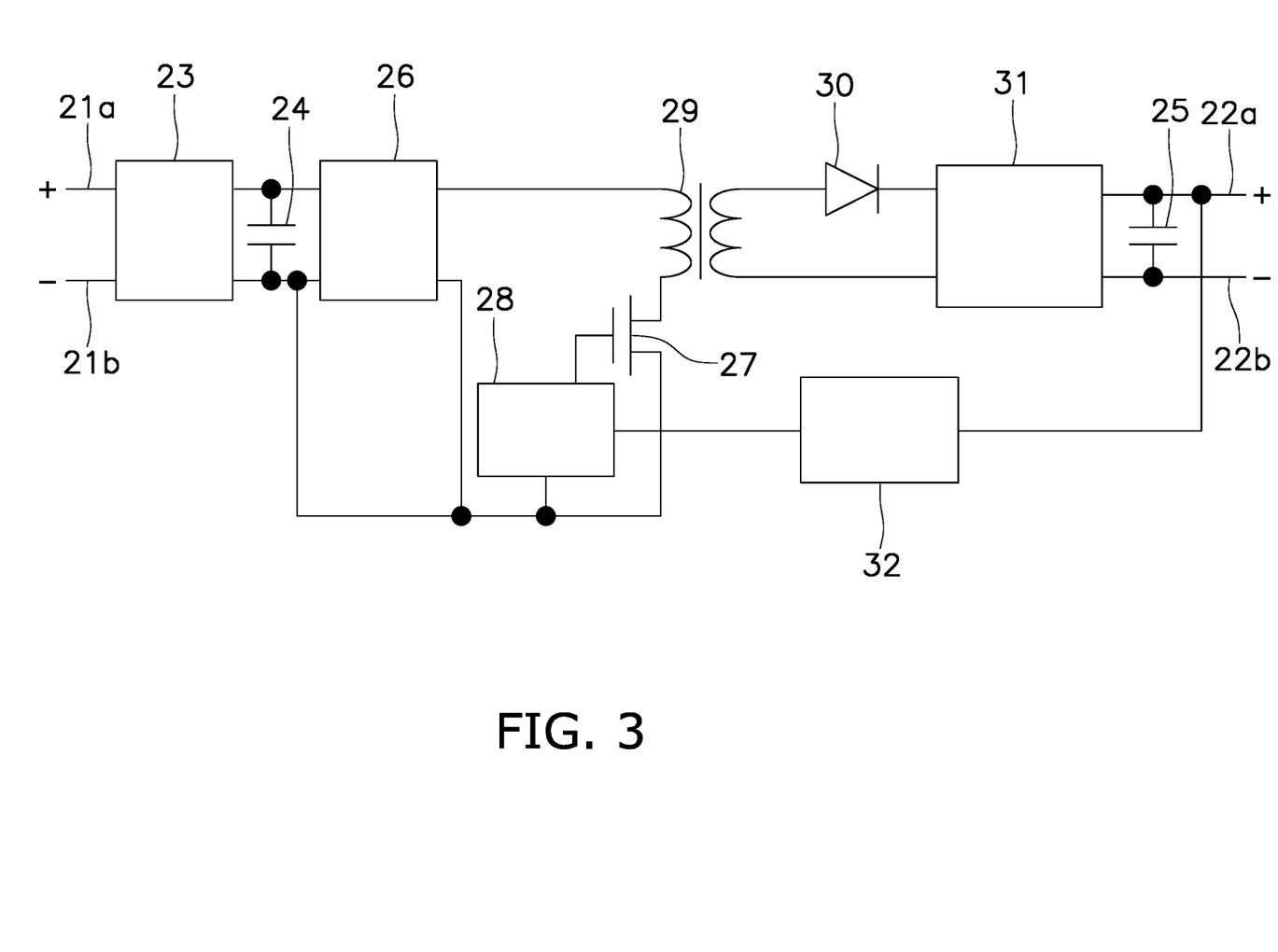
FIG. 3 is a circuit diagram schematically illustrating a configuration of a regulator.

FIG. 3 is a circuit diagram schematically illustrating a configuration of the regulator 11. The regulator 11 uses the electrical power generated by the solar cell modules 5a as a power source to generate a drive power source for driving the control device 4a and supplies the drive power source in a stable state to the control device 4a. The regulator 11 has a well-known configuration which includes input terminals 21a, 21b, output terminals 22a, 22b, a line filter 23, capacitors 24, 25, a booster circuit 26, a switching element 27, a control circuit 28, a transformer 29, a diode 30, a DC/DC converter 31, a feedback circuit 32 and the like. Note that the drive power source for the control device 4a may be supplied from an external power source.

Figure 4:
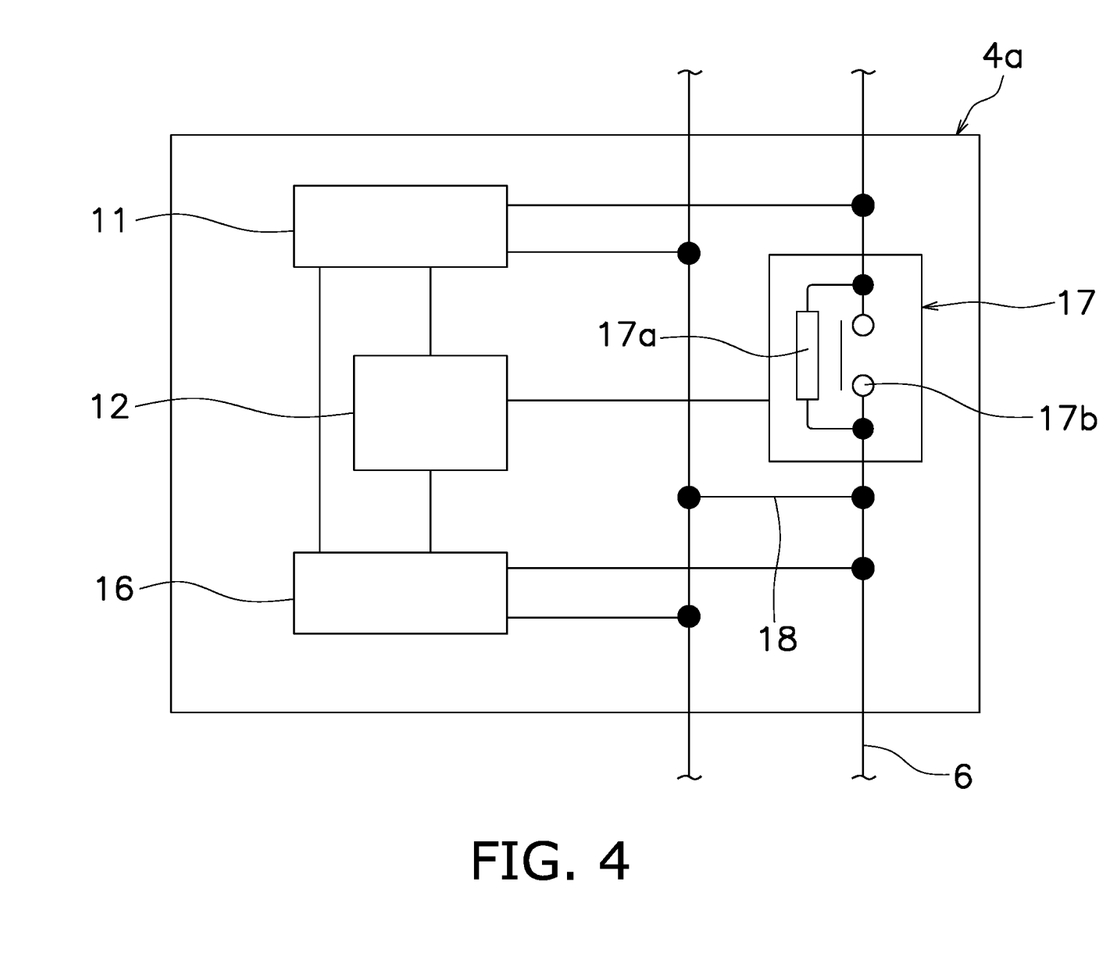
FIG. 4 is a diagram for illustrating a configuration of an opening/closing unit.

FIG. 4 is a block diagram for illustrating a configuration of the opening/closing unit 17. The opening/closing unit 17 opens and closes the connection between the solar cell modules 5a and the inverter 3. In the present embodiment, the opening/closing unit 17 opens and closes the connection between the solar cell module group 5A and the inverter 3. The solar cell module group 5A is connected to the inverter 3 via the control device 4a. The opening/closing unit 17 is installed to cut off the connection between the solar cell module group 5A and the inverter 3 at the time of decrease in the power output from the solar cell module group 5A or in an emergency such as a fire.

The opening/closing unit 17 is controlled to open or to close by the control unit 12. The opening/closing unit 17 includes a semiconductor relay 17a and a mechanical relay 17b. The semiconductor relay 17a is, for example, a switching device such as a MOSFET. The mechanical relay 17b is connected in parallel with the semiconductor relay 17a. When power source is not supplied to the control device 4a, the opening/closing unit 17 is in an open state, and the connection between the solar cell module group 5A and the inverter 3 is cut off. Therefore, when no power source is supplied to the control device 4a, the contacts of the mechanical relay 17b are in the open state (OFF state).

The bypass circuit 18 is a circuit for allowing the signal receiving unit 16 to receive a control signal from the control unit 3c when the control device 4a is in the state where the connection between the solar cell module group 5A and the inverter 3 is cut off. The bypass circuit 18 is also a circuit for maintaining the solar cell module groups 5B to 5D and the inverter 3 in an energized state when, for example, only the solar cell module group 5A is disconnected from the electric circuit among the solar cell module groups 5A to 5D. The signal receiving unit 16 of the control unit 12 is able to receive a control signal from the control unit 3c via the bypass circuit 18 while the connection between the solar cell module group 5A and the inverter 3 is cut off. Since the configurations of the control devices 4b to 4d are the same as those of the control devices 4a, the description thereof will be omitted.

Figure 5:
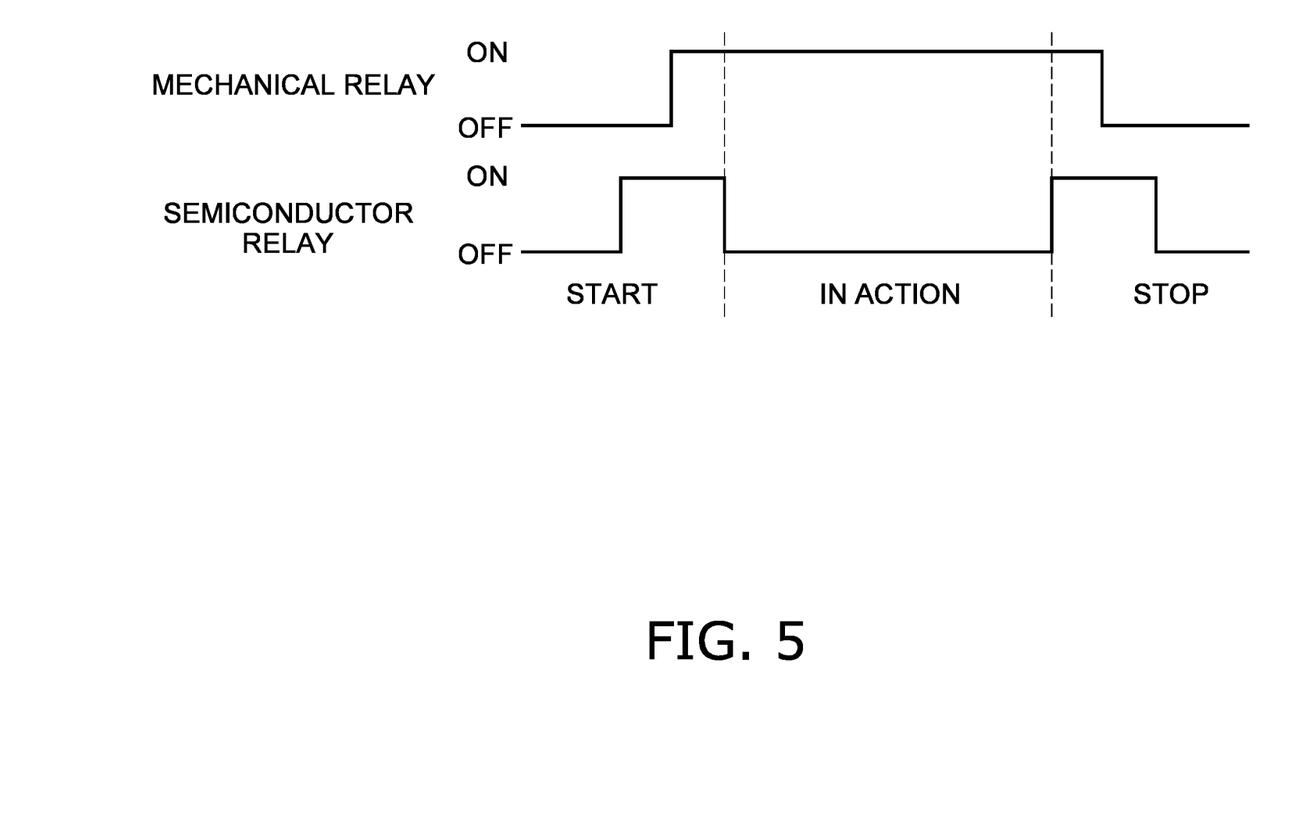
FIG. 5 is a timing chart illustrating the timings at which a semiconductor relay and a mechanical relay operate.

Next, with reference to FIG. 5, the operations of the opening/closing unit 17 when the control unit 12 controls the opening and closing of the opening/closing unit 17 will be described. FIG. 5 is a timing chart illustrating the timings at which the semiconductor relay 17a and the mechanical relay 17b operate.

When both the semiconductor relay 17a and the mechanical relay 17b are in an OFF state, the connection between the solar cell module group 5A and the inverter 3 is in a cut off state. Specific examples of the cut-off state include, for example, when the solar cell module 5a is not receiving sunlight because of night-time or influences of weather such as rain, or in an emergency such as a fire. In such cases, the electric power generated by the solar cell module group 5A is not output to the inverter 3.

As shown in FIG. 5, the control unit 12 first connects (turns ON) the semiconductor relay 17a in a case of connecting the solar cell module group 5A and the inverter 3 in the cut-off state in response to a control signal from the inverter 3 or an output signal from the sensor 15. At this time, the contacts of the mechanical relay 17b are in the OFF state. After turning the semiconductor relay 17a into the connected state (ON state), the control unit 12 turns the mechanical relay 17b into the ON state. After turning both the semiconductor relay 17a and the mechanical relay 17b into the ON state, the control unit 12 turns only the semiconductor relay 17a into the OFF state.

In contrast, the control unit 12 first turns the semiconductor relay 17a in the OFF state into the ON state in a case of cutting off the connection between the solar cell module group 5A and the inverter 3 in response to a control signal from the inverter 3 or an output signal from the sensor 15. After the semiconductor relay 17a is turned into the ON state, the control unit 12 opens the contacts of the mechanical relay 17b and turns the mechanical relay 17b in the ON state into the OFF state. After the mechanical relay 17b is turned into the OFF state, the control unit 12 turns semiconductor relay 17a into the OFF state.

As described above, the control unit 12 controls the opening and closing of the opening/closing unit 17, so that, when the electric power generated by the solar cell module group 5A is output to the inverter 3, the solar cell module group 5A and the inverter 3 are connected via the mechanical relay 17b. That is, the mechanical relay 17b is used for the connection at the time of energization. Therefore, during power generation, it is possible to reduce the loss of power generation efficiency due to the influences of the on-resistance of the semiconductor relay 17a.

In addition, in the solar power generation system 1 of the present embodiment, the control devices 4a to 4d are installed in the solar cell module groups 5A to 5D, respectively. As a result, it is possible to reduce the loss of power generation efficiency due to the influences of the on-resistance of the semiconductor relay 17a while reducing the installation cost of the control devices 4a to 4d.

Although one embodiment of the present invention has been described above, the present invention is not limited to the above embodiment, and various modifications can be made without departing from the gist of the invention.

Figure 6:
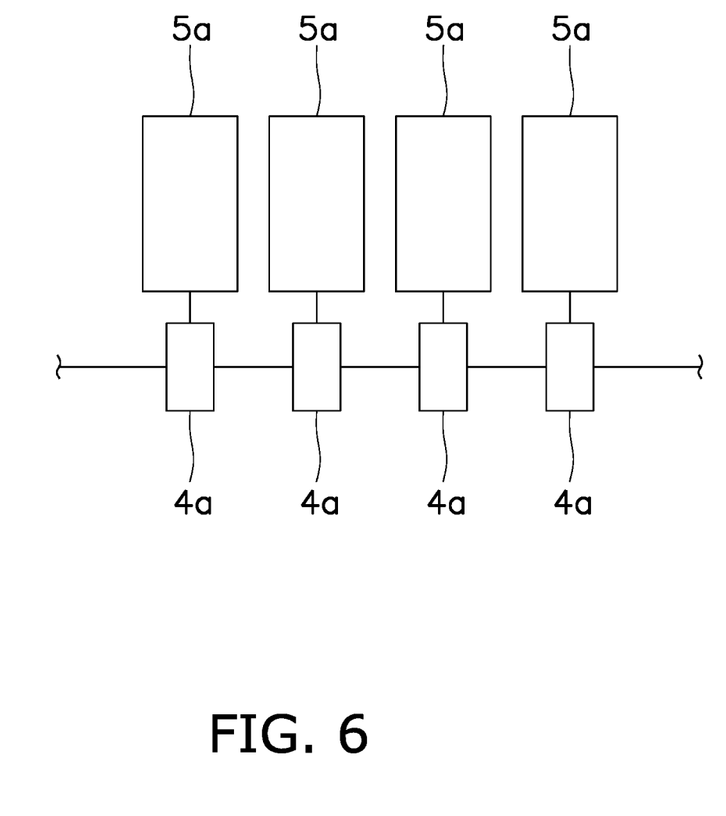
FIG. 6 is a schematic diagram illustrating control devices installed for each solar cell module.

In the above embodiment, the control devices 4a to 4d are installed in the solar cell module groups 5A to 5D, respectively, but as shown in FIG. 6, the control devices 4a may be installed in each of the solar cell modules 5a. In this case, the MPPT control is performed in the unit of the solar cell module 5a, and the opening/closing control of the opening/closing unit 17 is performed in the unit of the solar cell module 5a. Even in this case, it is possible to reduce the loss of power generation efficiency due to the influences of the on-resistance of the semiconductor relay 17a during power generation.

In the above embodiment, each of the solar cell module groups 5A to 5D includes four solar cell modules 5a, but the number of solar cell modules 5a is not limited to the above embodiment. Further, each of the solar cell module groups 5A to 5D does not necessarily include the same number of solar cell modules 5a. For example, the solar cell module group 5A may include four solar cell modules 5a, and the solar cell module group 5B may include five solar cell modules 5a. Furthermore, the arrangement and the number of control devices 4a to 4c are not limited to the above embodiment.

REFERENCE NUMERALS

1 Solar power generation system
3 Inverter
4a-4d Control devices
5A-5D Solar cell module groups
5a Solar cell module
12 Control unit
17 Opening/closing unit
17a Semiconductor relay
17b Mechanical relay

The invention claimed is:

1. A solar power generation system, comprising:

a plurality of solar cell module groups connected in series with each other, each of the plurality of solar cell module groups including, respectively, a plurality of solar cell modules;

an inverter connected to the plurality of solar cell module groups, the inverter configured to convert DC power generated by the plurality of solar cell modules included in the solar cell module groups into AC power; and control devices respectively installed in the plurality of solar cell module groups, each of the control devices configured to control a respective one of the plurality of solar cell module groups by MPPT control, the control devices each including an opening/closing unit comprising a semiconductor relay and a mechanical relay and being configured to open and close a connection between the respective one of the plurality of solar cell module groups and the inverter, and a control unit configured to control opening and closing of the opening/closing unit in response to a control signal from the inverter, wherein in a case of connecting a given one of the plurality of solar cell module groups and the inverter, the respective control unit turns ON the respective semiconductor relay to turn ON the respective mechanical relay, and then turns OFF the respective semiconductor relay while the respective mechanical relay is in an ON state, and in a case of cutting off the connection between the plurality of solar cell module groups and the inverter, the control unit turns ON the respective semiconductor relay to turn OFF the respective mechanical relay, and then turns OFF the respective semiconductor relay while the respective mechanical relay is in an OFF state.

2. The solar power generation system according to claim 1, wherein the control devices are driven by electric power supplied from the plurality of solar cell modules.

3. The solar power generation system according to claim 1, wherein the control devices are further configured to receive the control signal from the inverter via power line communication.

4. The solar power generation system according to claim 1, wherein each of the control devices further includes a signal receiving unit configured to receive the control signal from the inverter, and a bypass circuit configured to cause the signal receiving unit to receive the control signal from the inverter in a state where the connection between the plurality of solar cell module groups and the inverter is cut off.

* * * * *